United States Patent [19]

Nelson et al.

[11] Patent Number: 4,567,771
[45] Date of Patent: Feb. 4, 1986

[54] OPTICAL ACCELEROMETER

[75] Inventors: Arthur R. Nelson, Stow; Glenn R. Elion, Northborough, both of Mass.

[73] Assignee: ADC Fiber Optics Corporation, Westboro, Mass.

[21] Appl. No.: 502,979

[22] Filed: Jun. 10, 1983

[51] Int. Cl.$^4$ .................. G01H 9/00; G01P 15/08
[52] U.S. Cl. .................. 73/653; 73/517 R; 250/231 R
[58] Field of Search ............ 73/517 R, 517 B, 517 A, 73/653, 655; 250/231 R

[56]  References Cited
U.S. PATENT DOCUMENTS

| 2,343,063 | 2/1944 | Kent | 73/653 |
| 2,846,207 | 8/1958 | Marggraf | 73/517 R |
| 2,933,715 | 4/1960 | Beuermann | 73/654 |
| 3,209,601 | 10/1965 | Stiles | 73/517 B |
| 3,245,263 | 4/1966 | Cornelison | 73/383 |
| 3,494,204 | 2/1970 | Whitehead | 73/517 B |
| 4,218,614 | 8/1980 | Miller | 73/655 |
| 4,376,390 | 3/1983 | Rines | 73/517 A |
| 4,403,144 | 9/1983 | Strahan et al. | 73/655 |
| 4,414,471 | 11/1983 | Rines | 73/655 |

Primary Examiner—Stewart J. Levy
Assistant Examiner—John E. Chapman, Jr.
Attorney, Agent, or Firm—Weingarten, Schurgin, Gagnebin & Hayes

[57]  ABSTRACT

A wide bandwidth, high sensitivity optical accelerometer having a lever arm to amplify the mechanical displacement of the accelerometer mass element. The optical accelerometer includes a high resonant-frequency spring-mass system, wherein the acceleration forces up to several hundred Hz cause a linear displacement of the mass with force, which, through the lever arm, modulates the intensity of a beam of light with a large gain. The modulated light beam is in turn converted to an electrical signal which corresponds to the applied accelerating force. The accelerometer of the present invention may be largely fabricated from a single piece of material such as silicon, wherein the lever, mass, spring and supporting structure are etched from a single substrate according to known photolithographic processes. Alternatively, the accelerometer components may be molded from a sheet plastic or other material. The accelerometer herein described provides a desired wide bandwidth and high sensitivity characteristic, and may be economically and accurately fabricated according to known manufacturing techniques.

18 Claims, 4 Drawing Figures

OPTICAL ACCELEROMETER

FIELD OF THE INVENTION

The present invention relates to accelerometers, and in particular optical accelerometers having high bandwidth and high sensitivity.

BACKGROUND OF THE INVENTION

Accelerometers measure the force of acceleration by the displacement of a mass in a spring-mass system. Optical accelerometers apply the displacement of the mass to modulate the intensity of a light beam, which in turn is detected by a photodetector, providing a corresponding electrical signal. Typically, the mass comprises a metal weight and the spring comprises an elastomer, metal or other material which provides a restoring force; the spring and mass together form a resonant system, whose resonant frequency defines the upper limit of linear response to the accelerometer. Below the resonance, the amplitude of the displacement depends only on the received acceleration and the natural resonant frequency of the resonant system. As the resonant frequency is increased, the displacement is reduced according to the inverse square of the resonant frequency. Specifically, in a linear system, the displacement is given by the formula $$x = a/W^2_{res}$$

where x is the displacement, a is the acceleration and $W_{res}$ is the resonant frequency. Mechanical systems operating in other coordinate systems have equivalent equations, generally known in the art.

The upper frequency limit is important in particular applications such as seismic exploration, which requires a response up to about 500 Hz. It is therefore necessary to define the natural resonant frequency of the accelerometer resonant system to be 500 Hz or greater. Substituting a $W_{res}$ of 500 in the above equation, in order to detect accelerations of $10^{-7}$g (g = acceleration of gravity) typically found in seismic applications, the resulting motion of the mass in the resonant system is only $10^{-13}$ meters.

Previous systems have attempted to increase the accelerometer sensitivity by incorporating increasingly precise optical systems to measure the resulting mechanical displacement. This improvement has typically concentrated on improving lenses or optical gratings used to reduce the optical spot size, and therefore increase sensitivity. In one approach, the light is focused to a sharp point, wherein the small motions of the mechanical system provide a large percentage variation in the intensity of the focused light. However, even with the best optics, there is a practical limit to the smallest acceleration, as represented by mechanical displacement, that can be detected. For instance, in the case of optical accelerometers with diffraction limited optics, the minimum detectable acceleration at low frequencies is not as good as presently available moving-coil geophones.

In accelerometers with precision optical systems, the optical elements must be critically aligned during manufacture. Moreover, accelerometers having highly sensitive optical systems are also generally sensitive to the operating conditions such as temperature, which may need to be carefully controlled.

SUMMARY OF THE INVENTION

The optical accelerometer of the present invention provides improved reliability and sensitivity by mechanically amplifying the mechanical displacement resulting from the forces of acceleration. The mechanical amplification is provided by a lever system in conjunction with either a linear spring-mass system or a torsional-rotation system. The optical accelerometer further includes fiber optics for optical detection, in a compact, rugged design having high sensitivity and wide bandwidth. The accelerometer of this system achieves a mechanical resonance of at leat 500 Hz and an increase in sensitivity by a factor of at least 10.

The accelerometer described herein is manufactured according to various processes which include precision plastic molding and photolithographic processes, using materials such as plastic, single crystal silicon substrates, glass and ceramics. The materials can be molded or etched to include some of the resonant system components, and further include alignment recesses to assist in assembly of the complete optical accelerometer. Thus, the present invention achieves improved performance at reduced manufacturing costs without tedious alignment of the components.

BRIEF DESCRIPTION OF THE DRAWING

These and other features of the present invention will be better understood by reading the following, solely exemplary, detailed description together with the following drawing, wherein.

DETAILED DESCRIPTION OF THE INVENTION

Figure 1:
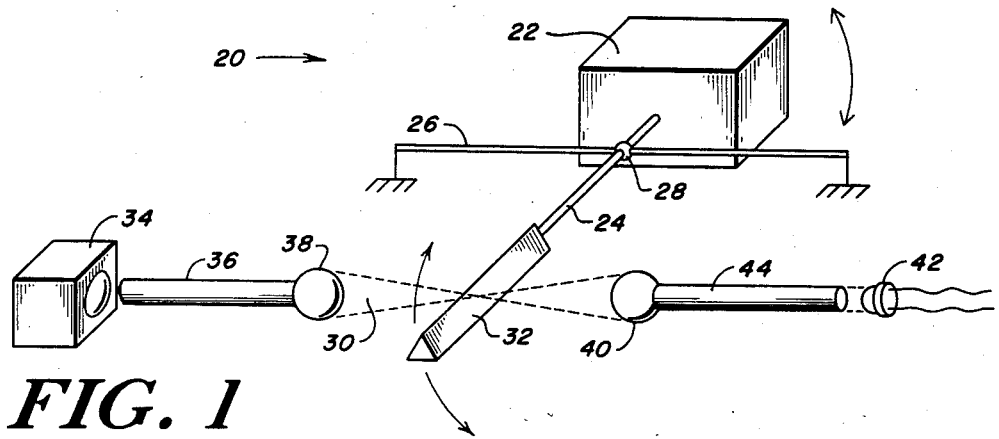
FIG. 1 is a pictorial view of one embodiment of the optical accelerometer of the present invention.
Figure 2:
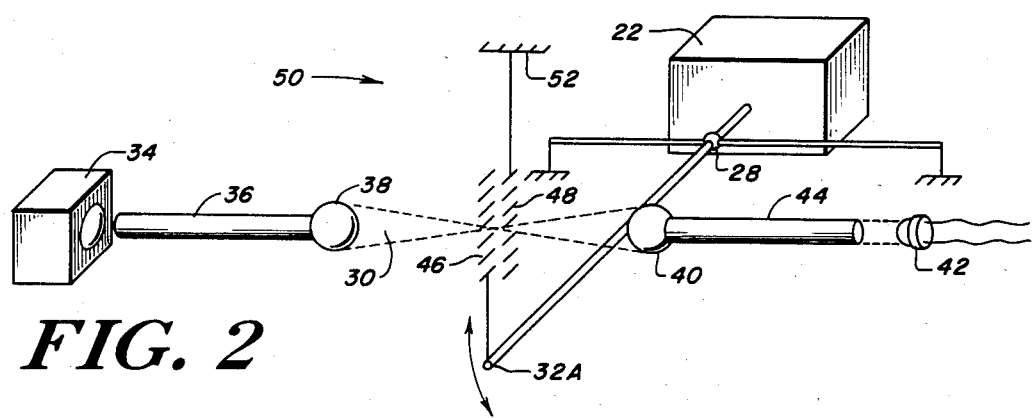
FIG. 2 is a pictorial view of the optical accelerometer of FIG. 1 incorporating light shutters for modulation.

According to the accelerometer of the present invention, the spring-mass system is typically adapted to form a torsional oscillator wherein the mass in conjunction with the restoring spring move in a rotational (e.g., cylindrical coordinate system. In the accelerometer 20 shown in FIG. 1, the mass 22 is suspended on the end of a lever 24. The restoring spring force and pivot for the lever 24 is provided by a torsion rod 26 attached to lever 24 at pivot point 28. The lever 24 extends forward of the pivot 28 to intercept and partially occlude a light path 30 at a point 32 typically formed by a knife edge. The accelerometer according to the present invention is sensitive to acceleration forces along a line normal to the axes of both the torsion rod 26 and the lever 24. The motion of the mass 22 is magnified into a larger and opposite motion at point 32; the magnification corresponds to the distance between the pivot 28 and the intercept point 32, and the distance between the pivot point 28 and the mass 22. Typically the amplification factor is at least 10, wherein the resulting critical motion at the lever point 32 is 10 times the actual mass 22 displacement. Also, according to the present invention, it is desired that the lever 24 have negligible mass relative to the principal mass 22. This may be achieved by making the lever 24 from a plastic material and the mass 22 from a metal such as lead. The lever 24 displacement at point 32 is detected by the resulting modulation of a light path 30 provided by a light source 34 through an optical fiber 36 and focused by a ball lens 38 to a waist in the vicinity of the edge 32. The light is then received and re-focused by a second ball lens 40 and transferred to a photodetector 42 through a second optical fiber 44.

An alternate embodiment 50 of the accelerometer achieves modulation on the light path 30 by a pair of shutters 48 and 46, used to reduce the optical spot size, disposed within the path 30. One of the shutters 48 is connected to a point 52 which is stationary with respect to the housing of the accelerometer (not shown), and the second shutter 46 is connected to the end 32A of lever 24. The mass 22 is mounted on the opposite end of the lever 24, and is movable about the pivot 28 formed at the junction between the lever 24 and the torsion bar 26. The light path is formed by the source of light 34 provided through an optical fiber 36 and focused by lens 38. The light is then received by the second lens 40 and transferred to the detector 42 through the optical fiber 44.

According to the present invention, precision optics providing a finely focused beam in the vicinity of the light intensity modulators are not required; the exact form of the beam of light at the point of modulation is not critical, and may comprise a finely focused beam of light, a broadly focused beam of light, a collimated beam of light, or any other intermediate lightpath forms.

Figure 3:
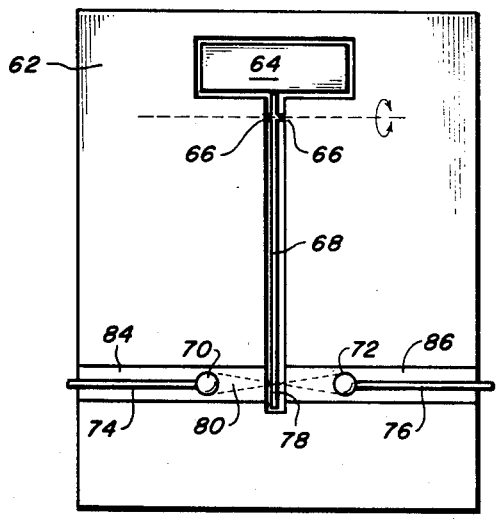
FIG. 3 is a plan view from the top of the structure of a single sheet accelerometer construction showing the locations of the elements.
Figure 4:
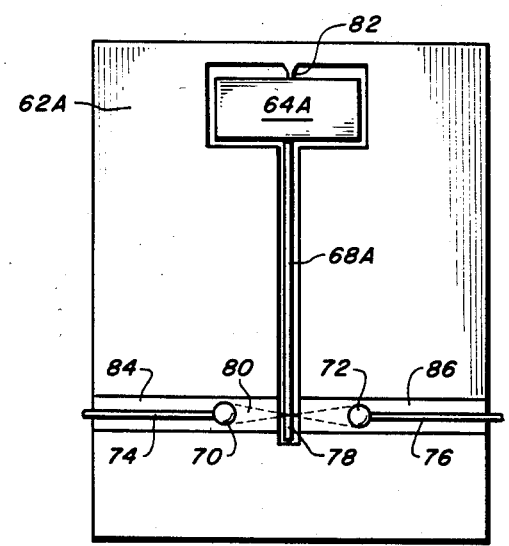
FIG. 4 is a plan view of an alternate lever system in a second single sheet accelerometer construction.

The accelerometer according to the present invention has an additional feature in which it may be fabricated from a single sheet according to one of a number of economical present-day fabrication techniques, such as photolithographic and precision molding methods, known in the art and not discussed here. Examples of the configuration of the accelerometer according to one or more of these techniques are shown in FIGS. 3 and 4. According to the accelerometer of the present invention, one or more of the component elements used therein may be formed of similar materials, or part of the same material. Additionally, these thusly formed elements may include grooves or location guides to further facilitate assembly with other components of the accelerometer. The accelerometer 60 of FIG. 3 shows a support 62 retaining a torsion rod 66 and a lever 68 including a mass 64. In this embodiment, these elements are formed entirely out of a single material by a single process. The accelerometers of FIGS. 3 and 4 are sensitive to accelerations perpendicular to the plane of the drawing, which causes the end of the lever 78 to variably intercept a path 80 of light. It is desired that the end of the lever block approximately 50 percent of the light when the accelerometer is in a quiescent or no acceleration state. Moreover, the accelerometer includes lens elements 70 and 72 as well as the fiber optic elements 74 and 76 which are aligned on the substrate 62 with the aid of alignment grooves and depressions 84 and 86 below the elements in the support 62.

An alternate embodiment 90 of the accelerometer is shown in FIG. 4, wherein a different type of lever system is used. As shown in the accelerometer 90, the mass 64A is located between a pivot point 82 and the end 78 providing the optical modulation, and is formed as a single structure within a sheet 62A. In the lever system thus formed, the spring restoration force is provided by a flexible portion of the lever at a pivot point 82, connecting the lever to the sheet 62A. According to the present invention, the resonant system is formed by the mass 64A in combination with the spring formed by the flexible section 82 and the lever 68A. The system mass can be augmented by attaching an additional weight (not shown) to the mass 64A. The light path 80 is determined by lenses 70 and 72 which receive and transmit light through optical fibers 74 and 76, respectively.

As mentioned above, elements of the accelerometer, and particularly the accelerometers 60 and 90 of FIGS. 3 and 4 may be formed in large part by mass fabrication techniques, such as precision plastic molding techniques. In addition, photolithographic techniques can also be used to fabricate this accelerometer with even greater precision. Such techniques are typically used for sheet silicon materials, where intricate shapes can be formed with precision in excess of the needs of the present invention. Alternatively, non-crystalline materials may be used, such as glass or ceramic materials, according to the respective processes for forming structures from sheets of the materials. The advantages achieved by fabricating several elements of the accelerometer of the present invention from a single material include the exact placement of the lever modulating end 78 within the path 80, and matched thermal coefficients of expansion of the accelerometer elements, which reduce or eliminate set-up and calibration adjustments, and allow accelerometer operation over a wide range of environmental conditions.

Modifications of and substitutions for elements of the above-described accelerometer by one skilled in the art are considered to be within the scope of the present invention. Accordingly, the present invention is not to be limited by the above, solely exemplary description, except according to the following claims.

What is claimed is:

1. An optical accelerometer for detecting static accelerations as low as $10^{-7}$ g as well as periodic accelerations up to 500 Hz comprising:

a support;

a mass displaceable by an acceleration force;

a spring mounted on said support, and connected ultimately to said displaceable mass, for providing a restoring force to said displaceable mass;

a lever having negligible mass relative to the mass of said displaceable mass, coupled to said displaceable mass, said lever amplifying any displacement of said mass and having a free end, the position of which is a function of the displacement of said displaceable mass;

the combination of said displaceable mass, said spring, and said lever forming a structure having a resonant frequency of at least 500 Hz; and noncontacting optical means for sensing the position of said free end of said lever, said sensing means operating on the principle of partial interruption of a light beam to provide a signal corresponding to the acceleration force.

2. The accelerometer of claim 1, wherein said spring connects said support and said negligible mass lever, is located adjacent said displaceable mass, and comprises a pivot.

3. The accelerometer of claim 2, wherein said spring further comprises a unitary torsion bar.

4. The accelerometer of claim 1, wherein said spring connects said suppot and said displaceable mass, is located at one end of said lever, and comprises a pivot.

5. The accelerometer of claim 4, wherein said spring further comprises a flexible portion of said lever.

6. The accelerometer of claim 4, wherein the amplification provided by said lever corresponds to a ratio between a first and a second distance;
  said first distance being the distance between the spring and the means for sensing; and
  said second distance being the distance between the spring and the mass.

7. The accelerometer of claim 1, wherein said means for sensing includes:
  a light source for providing illumination along a path;
  a photo detector for proving said signal according to the intensity of light received from said light source along said path; and
  means, associated with said free end of said lever, for modulating the intensity of the received light as a function of the position of said free end of said lever relative to said support.

8. The accelerometer of claim 7, wherein said means for modulating comprises an edge of said lever.

9. The accelerometer of claim 7, wherein said means for modulating comprises at last two shutters adapted to intercept said path, wherein at least one shutter is connected to said free end of said lever and at least one shutter is mounted to said support.

10. The accelerometer of claim 7, wherein at least one of said light source and said photo detector includes an optical fiber and a ball lens.

11. The accelerometer of claim 5, wherein said mass is lead and said lever is plastic.

12. The accelerometer of claim 1, wherein at least part of said means for sensing is mounted on said support.

13. The accelerometer of claim 12, wherein said mass, said spring, said lever and said support are formed from a single sheet material.

14. The accelerometer of claim 13, wherein said single material is a glass material.

15. The accelerometer of claim 13, wherein said single material is a silicon material.

16. The accelerometer of claim 13, wherein said single material is a plastic material.

17. The accelerometer of claim 13, wherein said single material is a ceramic material.

18. The accelerometer of claim 13, wherein the amplification provided by said lever corresponds to a ratio between a first and a second distance;
  said first distance being the distance between the spring and the means for sensing; and
  said second distance being the distance between the spring and the mass.

* * * * *

UNITED STATES PATENT AND TRADEMARK OFFICE
CERTIFICATE OF CORRECTION

PATENT NO. : 4,567,771

DATED : February 4, 1986

INVENTOR(S) : Arthur R. Nelson and Glenn R. Elion

It is certified that error appears in the above-identified patent and that said Letters Patent is hereby corrected as shown below:

Column 1, line 21, "response to the" should read --response of the--

Column 2, lines 47-48, "(e.g., cylindrical" should read --(e.g., cylindrical)--

Column 4, line 65, "suppot" should read --support--

Column 5, line 12, "proving" should read --providing--

Column 6, line 20, "claim 13" should read --claim 2--

Signed and Sealed this

Eleventh Day of August, 1987

Attest:

DONALD J. QUIGG

*Attesting Officer*　　　　　*Commissioner of Patents and Trademarks*